(12) United States Patent
Hao et al.

(10) Patent No.: US 12,553,756 B2
(45) Date of Patent: Feb. 17, 2026

(54) DEVICE AND METHOD FOR MEASURING VOLUME OF SPHERICAL TANK

(71) Applicant: ZHOUSHAN INSTITUTE OF CALIBRATION AND TESTING FOR QUALITY AND TECHNOLOGY SUPERVISION, Zhoushan (CN)

(72) Inventors: Huadong Hao, Zhoushan (CN); Junxue Chen, Zhoushan (CN); Xianlei Chen, Zhoushan (CN); Haolei Shi, Zhoushan (CN); Zenan Wu, Zhoushan (CN); Cunjun Li, Zhoushan (CN); Huizhong Xu, Zhoushan (CN); Yeyong Wang, Zhoushan (CN); Zhengqian Shen, Zhoushan (CN); Liang Li, Zhoushan (CN); Yan Zhang, Zhoushan (CN)

(73) Assignee: ZHOUSHAN INSTITUTE OF CALIBRATION AND TESTING FOR QUALITY AND TECHNOLOGY SUPERVISION, Zhejiang (CN)

( * ) Notice: Subject to any disclaimer, the term of this patent is extended or adjusted under 35 U.S.C. 154(b) by 263 days.

(21) Appl. No.: 18/504,860

(22) Filed: Nov. 8, 2023

(65) Prior Publication Data
US 2024/0068856 A1 Feb. 29, 2024

Related U.S. Application Data

(63) Continuation of application No. PCT/CN2023/117420, filed on Sep. 7, 2023.

(30) Foreign Application Priority Data
May 16, 2023 (CN) .......................... 202310561625.4

(51) Int. Cl.
*G01F 17/00* (2006.01)

(52) U.S. Cl.
CPC .................................... *G01F 17/00* (2013.01)

(58) Field of Classification Search
CPC ...................................................... G01F 17/00
(Continued)

(56) References Cited

U.S. PATENT DOCUMENTS 4,593,612 A * 6/1986 Rieger ..................... C12G 1/02
366/144
6,166,542 A * 12/2000 Gallop .................... G01F 23/22
324/300
(Continued)

FOREIGN PATENT DOCUMENTS

| CN | 112585076 A | 3/2021 |
| CN | 214276789 U | 9/2021 |

(Continued)

OTHER PUBLICATIONS

Ziyong Liu et al., "Spherical Metal Tank Capacity", National Metrological Verification Regulation of the People's Republic of China JJG 642-2007, Feb. 21, 2008, pp. 1-11.

*Primary Examiner* — Peter J Macchiarolo
*Assistant Examiner* — Rodney T Frank (57) ABSTRACT

A device for measuring volume of spherical tanks, includes a base, four supporting rods, a driving mechanism, a rotating disc and a counterweight mechanism. The base is provided with a first through hole and a circular fixing base with a second through hole. The supporting rods are circumferentially provided on the fixing base, with a sliding rod slidably provided at the lower side. An outer end of the sliding rod is provided with a limiting plate. The driving mechanism can drive the sliding rods to move simultaneously in radial directions. The rotating disc with a third through hole is arranged on the fixing base, and is rotatably provided with (Continued)

a reel around which a steel tape is wound. A free end of the steel tape is provided with a balancing disc whose opposite sides are provided with laser rangefinders. The counterweight mechanism can keep the balancing disc stable.

10 Claims, 9 Drawing Sheets

(58) Field of Classification Search
USPC .......................................................... 73/861
See application file for complete search history.

(56) References Cited

U.S. PATENT DOCUMENTS

| | | | |
|---|---|---|---|
| 9,511,857 B2 * | 12/2016 | Chai | B64C 39/006 |
| 2011/0000909 A1 * | 1/2011 | Huang | B60S 5/02 |
| | | | 220/88.1 |
| 2022/0316936 A1 * | 10/2022 | Schwager | G01K 13/00 |
| 2022/0349514 A1 * | 11/2022 | Liu | F16M 11/2021 |

FOREIGN PATENT DOCUMENTS

| | | | | |
|---|---|---|---|---|
| CN | 215636361 U | | 1/2022 | |
| CN | 217679307 U | | 10/2022 | |
| CN | 218916168 U | | 4/2023 | |
| CN | 116659605 A | * | 8/2023 | ............. G01F 17/00 |
| JP | H09248643 A | | 9/1997 | |

* cited by examiner

DEVICE AND METHOD FOR MEASURING VOLUME OF SPHERICAL TANK

CROSS-REFERENCE TO RELATED APPLICATIONS

This application is a continuation of International Patent Application No. PCT/CN2023/117420, filed on Sep. 7, 2023, which claims the benefit of priority from Chinese Patent Application No. 202310561625.4, filed on May 16, 2023. The content of the aforementioned application, including any intervening amendments made thereto, is incorporated herein by reference in its entirety.

TECHNICAL FIELD

This application relates to capacity verification of storage tanks, and more particularly to a device and method for measuring volume of a spherical tank.

BACKGROUND

Spherical tank is a closed pressure vessel for storage and volume calculation of liquefied petroleum gas and light liquefied chemical products. It is generally constructed in the shape of a sphere. Considering the slight difference in diameters in individual directions after actual construction, it is necessary to measure an equatorial diameter and a vertical diameter of the spherical tank to calculate its accurate capacity.

Currently, the diameter of spherical tanks is often measured by a theodolite or a handheld laser rangefinder. In the actual measurement, horizontal angle α and zenith distances Z1 and Z2 of the spherical tank, and a horizontal distance s from the center of a theodolite to the center of the spherical tank are measured in a tangent direction of the tank through an optical collimation axis of the theodolite, such that an equatorial diameter and a vertical diameter of the spherical tank are obtained. The horizontal distance s and the projection of a center point of the spherical tank on the ground require manual measurement and correction, which results in complicated operations. Moreover, there are many column supports on the outside of the spherical tank, making it difficult to determine four tangent points on the top, bottom, left and right ends simultaneously.

Regarding the laser rangefinder-based measurement, it is required to temporarily set up a platform in the spherical tank, and the laser rangefinder is manually carried to the inside of the spherical tank to measure an inner equatorial diameter and an inner vertical diameter. The semi-closed dark space in the spherical tank leads to many safety hazards for the surveyors working inside.

SUMMARY

In view of the problems mentioned above in the prior art, an object of the present disclosure is to provide a device and method for measuring volume of a spherical tank, which can measure the inner equatorial diameter without manual operation inside the spherical tank, allowing for simple operation, and high safety and reliability.

Technical solutions of the present disclosure are described as follows.

According to a first aspect of the disclosure, a device for measuring volume of a spherical tank is provided, comprising:
a base;
four supporting rods;
a driving mechanism;
a rotating disc; and
a counterweight mechanism;
wherein the base is fixedly provided with a fixing base with a circular shape; the base is also provided with a first through hole; and the fixing base is provided with a second through hole directly opposite to the first through hole in a vertical direction;
the four supporting rods are circumferentially arranged on the fixing base; a length direction of each of the four supporting rods is consistent with a radial direction of the fixing base; a lower side of each of the four supporting rods is slidably provided with a sliding rod; and an outer end of the sliding rod is provided with a limiting plate;
the driving mechanism is arranged on the base, and is configured to drive four sliding rods to simultaneously move along the radial direction of the fixing base;
the rotating disc is arranged on the fixing base, and is provided with a third through hole located directly above the second through hole; the rotating disc is rotatably provided with a first rotating shaft; the first rotating shaft is coaxially provided with a reel; a steel tape is wound on the reel; a free end of the steel tape is configured to pass through the third through hole, the second through hole and the first through hole in sequence to reach a position below the base, and is provided with a balancing disc; and opposite sides of the balancing disc are each provided with a laser rangefinder; and two laser rangefinders are located on the same straight line; and
the counterweight mechanism is arranged on the balancing disc, and is configured to keep the balancing disc stable.

In some embodiments, the driving mechanism comprises:
a rotating ring;
four transmission structures; and
a driving structure;
wherein the rotating ring is coaxially and rotatably provided on the base;
the four transmission structures are arranged on the base, and are in one-to-one correspondence with the four sliding rods; and each of the four transmission structures is configured to drive a corresponding one of the four sliding rods to slide in the radial direction of the fixing base by using rotation of the rotating ring; and
the driving structure is arranged on the base, and is configured to drive the rotating ring to rotate.

In some embodiments, each of the four transmission structures comprises:
a first gear ring;
a rack; and
a second rotating shaft;
wherein the first gear ring is coaxially fixed on an outer side surface of the rotating ring;
a side of each of the four sliding rods is provided with the rack along a length direction; and
the second rotating shaft is vertically and rotatably provided on the base; a first gear and a second gear are coaxially provided on the second rotating shaft; the first gear is engaged with the first gear ring; and the second gear is engaged with the rack.

In some embodiments, the driving structure comprises:
a second gear ring;
a horizontal shaft;
a third gear; and a handle;
wherein the second gear ring is coaxially fixed on an upper side of the rotating ring;
a supporting plate is vertically fixed on the base; the horizontal shaft is rotatably and horizontally arranged on the supporting plate; and a length direction of the horizontal shaft is consistent with a radial direction of the rotating ring;
the third gear is coaxially fixed at an inner end of the horizontal shaft, and is engaged with the second gear ring; and
the handle is fixed on an outer end of the horizontal shaft.

In some embodiments, the counterweight mechanism comprises:
a screw;
a threaded pipe;
a plurality of pull ropes; and
a lifting structure;
wherein the screw is vertically and rotatably arranged on the balancing disc; a top plate is rotatably arranged on an upper end of the screw; and the free end of the steel tape is fixedly connected to the top plate;
the threaded pipe is threadedly connected to the screw;
a side of the balancing disc is circumferentially and evenly provided with a plurality of perforations; the plurality of perforations are in one-to-one correspondence with the plurality of pull ropes; a first end of each of the plurality of pull ropes is fixed on an outer side of the threaded pipe, and a second end of each of the plurality of pull ropes passes through a corresponding one of the plurality of perforations to reach a position below the balancing disc; and the second end of each of the plurality of pull ropes is fixedly connected with a balancing block; and
the lifting structure is arranged on the balancing disc, and is configured to drive the threaded pipe to rise and fall along the screw.

In some embodiments, the lifting structure comprises:
a counterweight; and
a limiting structure;
wherein the counterweight is fixed on a lower side of the balancing disc, and is provided with an installation cavity inside; a motor is provided in the installation cavity, and is in transmission connection with the screw; and
the limiting structure is arranged on the balancing disc, and is configured to limit rotation of the threaded pipe.

In some embodiments, the limiting structure comprises two limiting assemblies symmetrically arranged on the balancing disc; each of the two limiting assemblies comprises a slider and a connecting rod; the slider is slidably arranged on an upper side of the balancing disc (7) in a radial direction of the balancing disc, and comprises an extension plate; and
a first end of the connecting rod is hingedly connected to the outer side of the threaded pipe, and a second end of the connecting rod is hingedly connected to the extension plate.

In some embodiments, the rotating disc is rotatably arranged on the fixing base; an operating rod is vertically arranged on an upper side of the rotating disc; a limiting rod is horizontally arranged on the side of the rotating disc; two vertical rods are vertically fixed on the fixing base along a circumferential direction of the fixing base; an angle between a connection line between one of the two vertical rods and a center of the rotating disc and a connection line between the other of the two vertical rods and the center of the rotating disc is 90 degrees; and the limiting rod is configured to rotate between the two vertical rods.

In some embodiments, a lower side of an outer end of each of the four supporting rods is hingedly connected with a suction cup.

According to a second aspect of the disclosure, a method for measuring volume of a spherical tank is provided, comprising:
(1) placing the base in the opening of the spherical tank so that the four supporting rods are set up on the surrounding plate; rotating the handle to drive the rotating ring to rotate, so as to simultaneously drive the four first gears to rotate to push the four sliding rods to slide outward;
(2) when the limiting plate is in contact with a side wall of the surrounding plate, and the first through hole, the second through hole, and the third through hole are located directly above the opening of the spherical tank, attaching a suction cup at an outer end of each of the four supporting rods to an outer side wall of the spherical tank;
(3) rotating the reel to lower the steel tape; when a released length of the steel tape is close to a radius of the spherical tank, reducing a lowering speed, starting the two laser rangefinders simultaneously to perform measurement to collect multiple sets of data, and obtaining multiple total length results based on the multiple sets of data, wherein a maximum value among the multiple total length results is an inner equatorial diameter A;
(4) operating the operating rod to drive the rotating disc to rotate 90 degrees, so that a current connection line between the two laser rangefinders on the balancing disc is perpendicular to a previous connection line between the two laser rangefinders, collecting multiple sets of data, calculating multiple total length results, wherein a maximum value among the multiple total length results is an inner equatorial diameter B, and calculating an average value of the inner equatorial diameter A and the inner equatorial diameter B to obtain an actual inner equatorial diameter C;
(5) continuing to rotate the reel to lower the steel tape, and when the balancing disc extends out of an opening at a bottom of the spherical tank, obtaining an inner vertical diameter D through the steel tape; and
(6) calculating a volume V of the spherical tank based on the actual inner equatorial diameter C and the inner vertical diameter D.

Compared with the prior art, this disclosure has the following advantages.
(1) The base is placed into the upper opening and set up on the surrounding plate through the four supporting rods. The handle is rotated to drive the first rotating ring to rotate, thereby simultaneously driving the four first gears and the second rotating shafts to rotate. The four sliding rods are driven by the four second gears to slide outward, so that the four limiting plates approach and contact an inner wall of the surrounding plate simultaneously. The position of the base is adjusted by the four limiting plates contacting an inner wall of the surrounding plate successively, so that the base is finally located directly above the upper opening and fixed. Lowering the steel tape on the reel allows the balancing disc to be lowered into an interior of the spherical tank. The lowering height of the balancing disc can be seen through a scale on the steel tape. After lowering the balancing disc to an appropriate height, a lowering speed is slowed down and the two laser rangefinders are activated simultaneously to perform measurement to collect multiple sets of data. Multiple total length results based on the multiple sets of data are calculated and a maximum value among the multiple total length results is an inner equatorial diameter. This method can measure the inner equatorial diameter without manual operation inside the spherical tank, allowing for simple operation, and high safety and reliability.

(2) The handle is rotated manually, thereby driving the third gear and the second gear ring to rotate through the horizontal shaft and driving the first rotating ring and the first gear ring to rotate, so that the racks and the sliding rods are pushed to move radially. This ensures the four sliding rods sliding synchronously, with a simple structure and high transmission efficiency.

(3) When lowering the balancing disc, the balancing blocks at the lower ends of the plurality of pull ropes are positioned under the balancing disc to increase a weight around the balancing disc. The balancing blocks are circumferentially and evenly arranged to prevent the balancing disc from swinging. When the balancing disc reaches a measuring height, the motor is started to drive the screw to rotate such that the threaded pipe is driven to move upward, and the balancing blocks under the pull ropes are pulled to move upward, thereby finally contacting a lower side of the balancing disc. Due to the same length of the pull ropes, the balancing disc is in a horizontal state. Meanwhile, the pull ropes are equivalent to several oblique braces for the balancing disc, which can prevent the balancing disc from twisting and improve the measurement accuracy of the laser rangefinders.

In the drawings: 1. spherical tank; 11. upper opening; 111. surrounding plate; 2. base; 21. first through hole; 22. rotating ring; 23. first gear ring; 24. second gear ring; 25. second rotating shaft; 251. first gear; 252. second gear; 26. horizontal shaft; 261. first handle; 262. third gear; 263. supporting plate; 3. fixing base; 31. second through hole; 32. first vertical rod; 4. rotating disc; 41. third through hole; 411. guide roller; 42. operating rod; 43. first limiting rod; 5. reel; 51. first rotating shaft; 511. external thread; 512. fixing nut; 513. fixing plate; 52. second handle; 53. steel tape; 6. supporting rod; 61. first cavity; 611. first slotted hole; 62. sliding rod; 621. rack; 622. first slider; 623. limiting plate; 63. suction cup; 7. balancing disc; 71. screw; 711. top plate; 712. threaded pipe; 72. second cavity; 721, second slotted hole; 73. second slider; 731. extension plate 74. laser rangefinder; 75. connecting rod; 76. guide pulley; 77. perforation; 8. pull rope; 81. balancing block; 9. counterweight; 91. installation cavity; and 92. motor.

DETAILED DESCRIPTION OF EMBODIMENTS

This application will be described in detail below with reference to the embodiments and accompanying drawings to make the technical solutions of this application clearer, but these embodiments are not intended to limit the scope of this application.

Embodiment 1

As illustrated in FIGS. 1-9, a device for measuring volume of a spherical tank 1 is provided, where the spherical tank 1 is provided with an upper opening 11 on the top, and a surrounding plate 111 is arranged on the edge of the upper opening 11.

Figure 1:
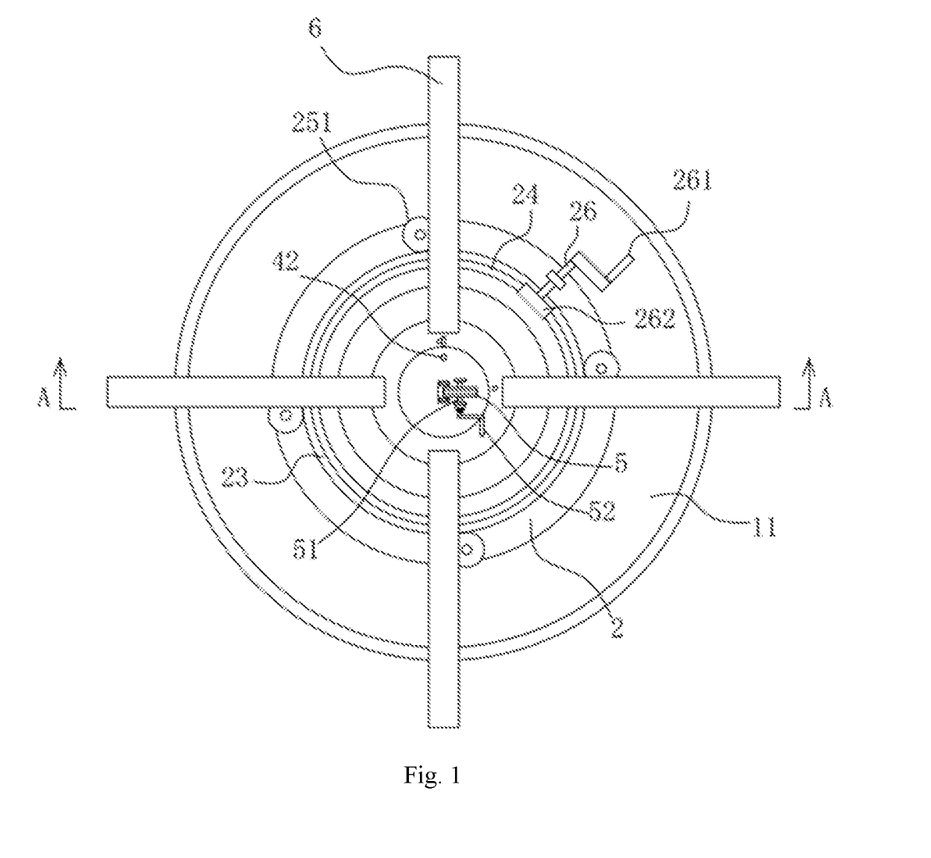
FIG. 1 is a structural schematic diagram of a device for measuring volume of a spherical tank according to an embodiment of the present disclosure.
Figure 2:
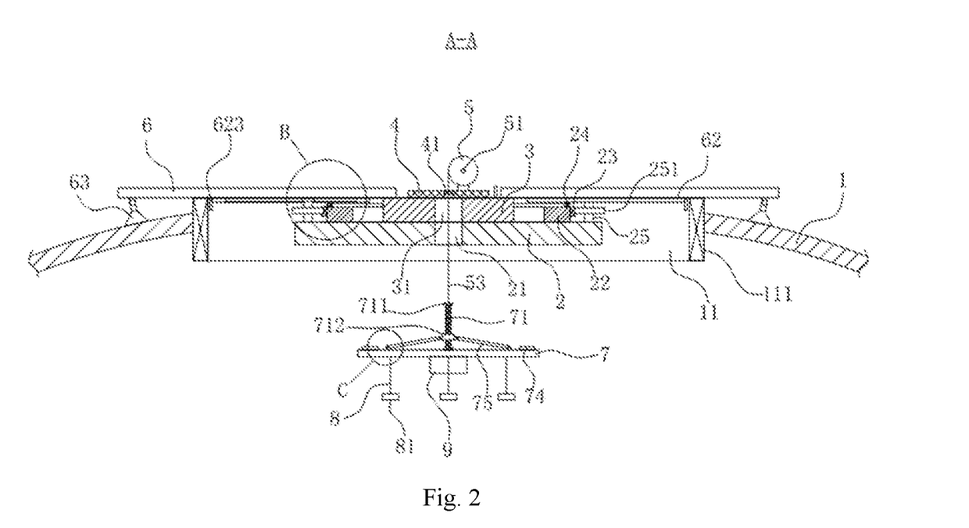
FIG. 2 is a sectional view of the device along A-A in FIG. 1.

The volume measuring device includes a base 2, four supporting rods 6, a driving mechanism, a rotating disc 4 and a counterweight mechanism.

The base 2 is fixedly provided with a fixing base 3 with a circular shape; the base 2 is also provided with a first through hole 21. The fixing base 3 is provided with a second through hole 31 directly opposite to the first through hole 21 in a vertical direction.

The four supporting rods 6 are circumferentially arranged on the fixing base 3. A length direction of each of the four supporting rods 6 is consistent with a radial direction of the fixing base 3. Each of the supporting rods 6 is provided with a first cavity 61 along a length direction. A lower side of each of the four supporting rods 6 is provided with a first slotted hole 611, which is connected with the first cavity 61. A first slider 622 is slidably arranged in each of the first cavities 61. A lower side of each of the first sliders 622 extends through the first slotted hole 611 to an outer incised end of the supporting rod 6 and are connected with sliding rod 62. An outer end of each of the sliding rods 62 is provided with limiting plates 623.

Preferably, suction cups 63 made of a rubber material are hingedly arranged on a lower side of an outer end of each of the supporting rods 6, which can fix the supporting rods 6 to prevent the supporting rods 6 from deflecting.

Figure 3:
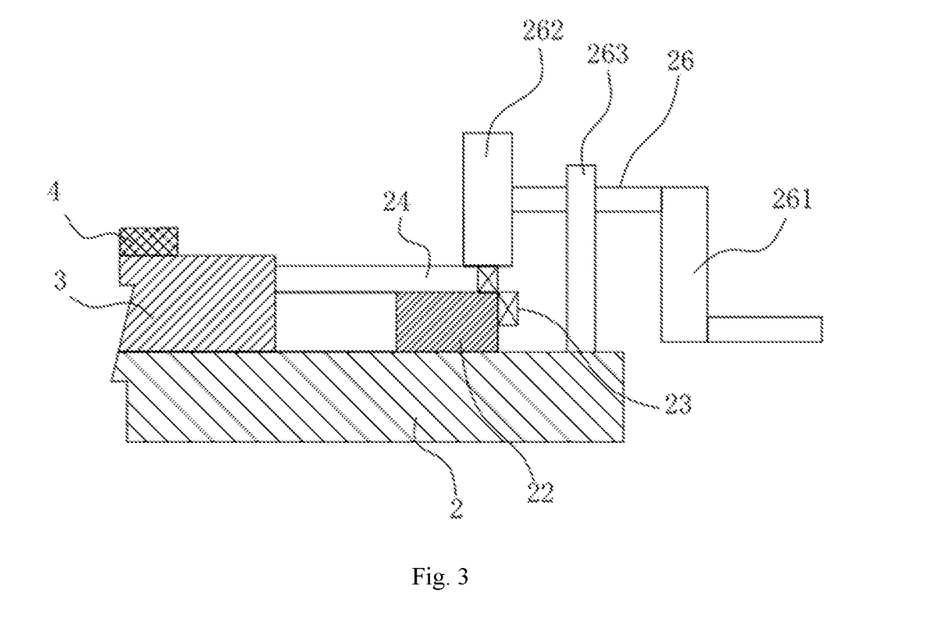
FIG. 3 is a partial view of a horizontal shaft according to an embodiment of the present disclosure.

The driving mechanism is arranged on the base 2, including a rotating ring 22, four transmission structures and a driving structure. The rotating ring 22 is coaxially and rotatably provided on the base 2. The four transmission structures are arranged on the base 2, and are in one-to-one correspondence with the four sliding rods 62. Each of the four transmission structures includes a first gear ring 23, a rack 621 and a second rotating shaft 25. The first gear ring 23 is coaxially fixed on an outer surface of the rotating ring 22. The rack is arranged on a side surface of each of the sliding rods 62 along the length direction. The second rotating shaft 25 is vertically and rotatably installed on the base 2 and is coaxially provided with first gears 251 and second gears 252. The first gears 251 are engaged with the first gear ring 23, and the second gears 252 are engaged with the racks 621. The driving structure is arranged on the base 2, and is configured to drive the rotating ring 22 to rotate.

Figure 4:
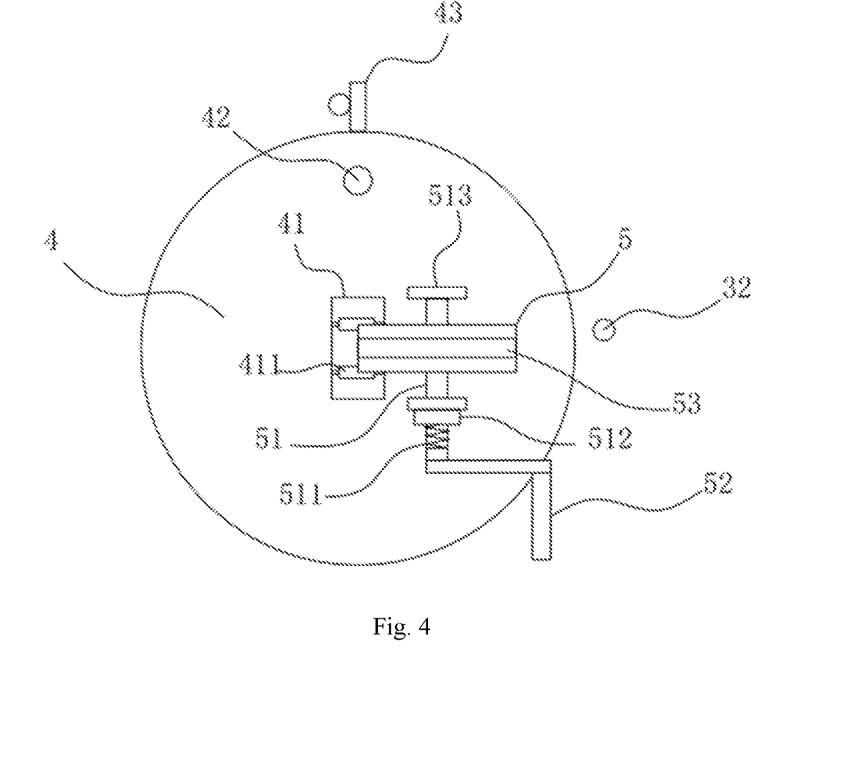
FIG. 4 is a partial view of a rotating disc according to an embodiment of the present disclosure.
Figure 5:
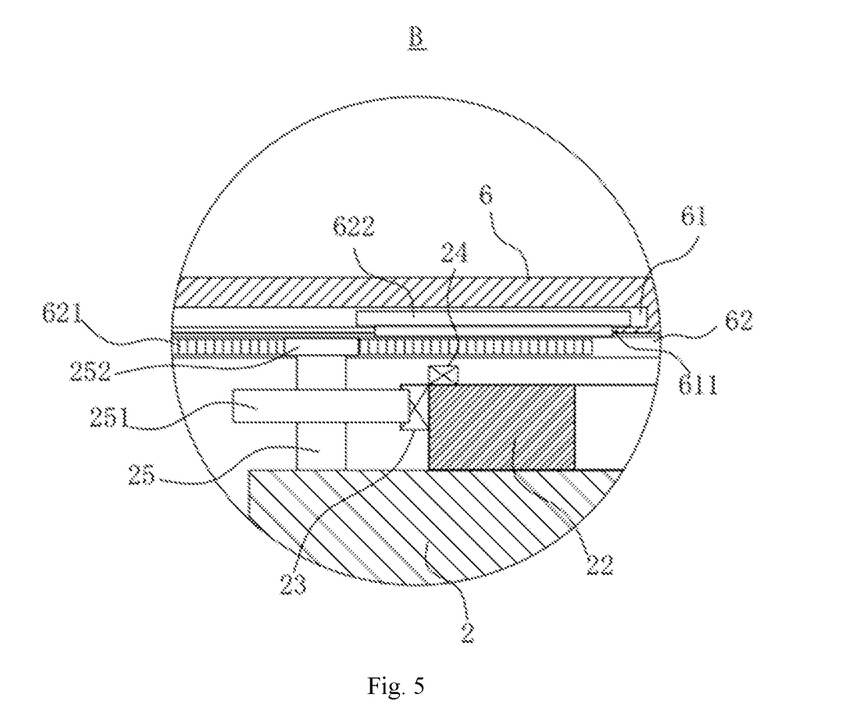
FIG. 5 is a partial enlarged view of part B in FIG. 2.
Figure 6:
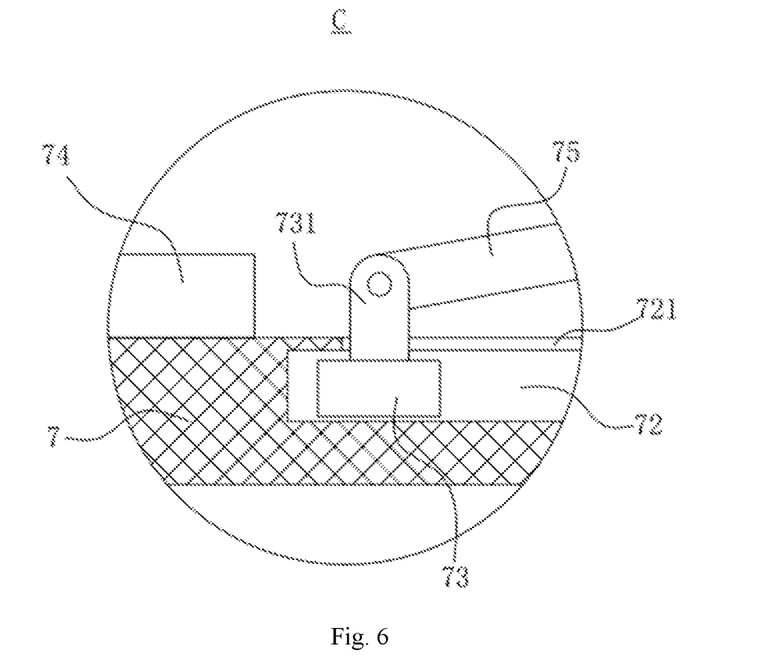
FIG. 6 is a partial enlarged view of part C in FIG. 2.

The rotating disc 4 is arranged on the fixing base 3, and is provided with a third through hole 41 located directly above the second through hole 31. The rotating disc 4 is rotatably provided with a first rotating shaft 51 through two fixing plates 513. The first rotating shaft 51 is coaxially provided with a reel 5 and a steel tape 53 is wound on the reel 5. A free end of the steel tape 53 is configured to pass through the third through hole 41, the second through hole 31 and the first through hole 21 in sequence to reach a position below the base 2, and is provided with a balancing disc 7. The opposite sides of the balancing disc 7 are each provided with a laser rangefinder 74, and the two laser rangefinders 74 are located on the same straight line. Preferably, two guide rollers 411 are rotatably arranged in the third through hole 41, which are respectively located on both sides of a width direction of the steel tape 53 to play an auxiliary guiding role.

Figure 7:
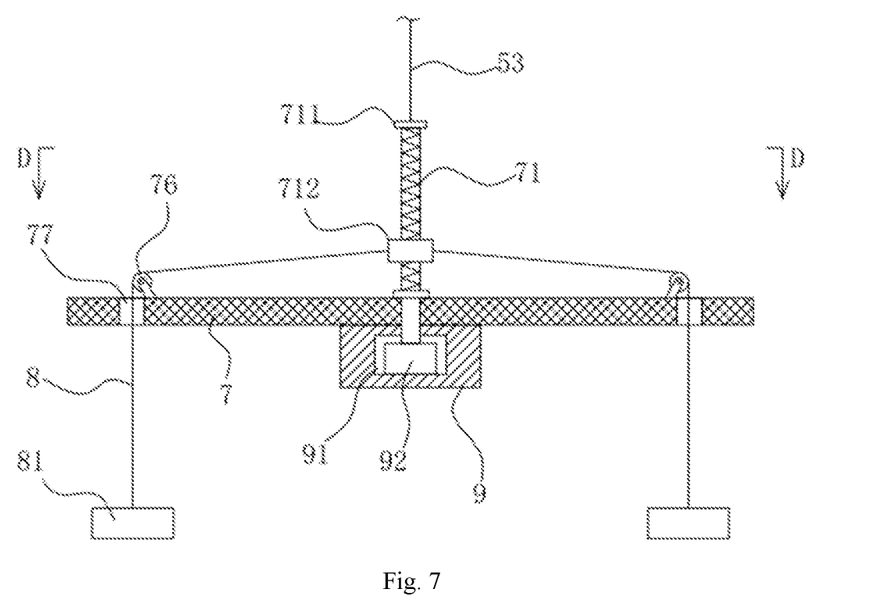
FIG. 7 is a partial view of a balancing disc according to an embodiment of the present disclosure.
Figure 8:
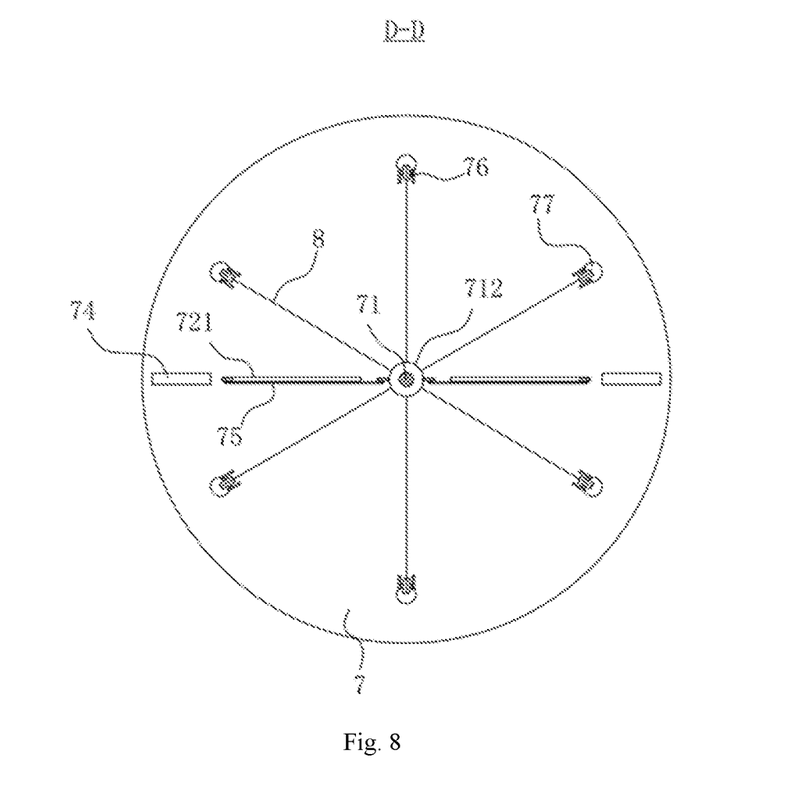
FIG. 8 is a sectional view of the balancing disc along D-D in FIG. 7.

The counterweight mechanism is arranged on the balancing disc 7, and is configured to keep the balancing disc 7 stable.

The base 2 is placed into the upper opening 11 and set up on the surrounding plate 111 through the four supporting rods 6. The driving structure is configured to drive the rotating ring 22 to rotate, thereby simultaneously driving the four first gears 251 and the second rotating shafts 25 to rotate. The four sliding rods 62 is driven by the four second gears 252 to slide outward, so that the four limiting plates 623 approach and contact the inner wall of the surrounding plate 111 simultaneously. A position of the base 2 is adjusted by the four limiting plates 623 contacting an inner wall of the surrounding plate 111 successively, so that the base 2 is finally located directly above the upper opening 11 and fixed. Lowering the steel tape 53 on the reel 5 allows the balancing disc 7 to be lowered into an interior of the spherical tank 1. A lowering height of the balancing disc 7 can be seen through a scale on the steel tape 53. After lowering the balancing disc 7 to an appropriate height, a lowering speed is slowed down and the two laser rangefinders 74 are activated simultaneously to perform measurement to collect multiple sets of data. Multiple total length results based on the multiple sets of data are obtained and a maximum value among the multiple total length results is an inner equatorial diameter. This method can measure the inner equatorial diameter without manual operation inside the spherical tank 1, allowing for simple operation, and high safety and reliability. Moreover, the counterweight mechanism can keep the balancing disc 7 stable and improve a measurement accuracy of the laser rangefinders 74.

In this embodiment, the driving structure includes a second gear ring 24, a horizontal shaft 26, a third gear 262 and a first handle 261.

The second gear ring 24 is coaxially fixed on an upper side of the rotating ring 22.

A supporting plate 263 is vertically fixed on the base 2, and the horizontal shaft 26 is rotatably and horizontally arranged on the supporting plate 263. A length direction of the horizontal shaft 26 is consistent with a radial direction of the rotating ring 22.

The third gear 262 is coaxially fixed at an inner end of the horizontal shaft 26, and is engaged with the second gear ring 24.

The first handle 261 is fixed on an outer end of the horizontal shaft 26.

The first handle 261 is rotated manually, thereby driving the third gear 262 and the second gear ring 24 to rotate through the horizontal shaft 26 and driving the rotating ring 22 and the first gear ring 23 to rotate, so that the racks 621 and the sliding rods 62 are pushed to move radially. This ensures that the four sliding rods 62 slide synchronously, with a simple structure and high transmission efficiency.

Figure 9:
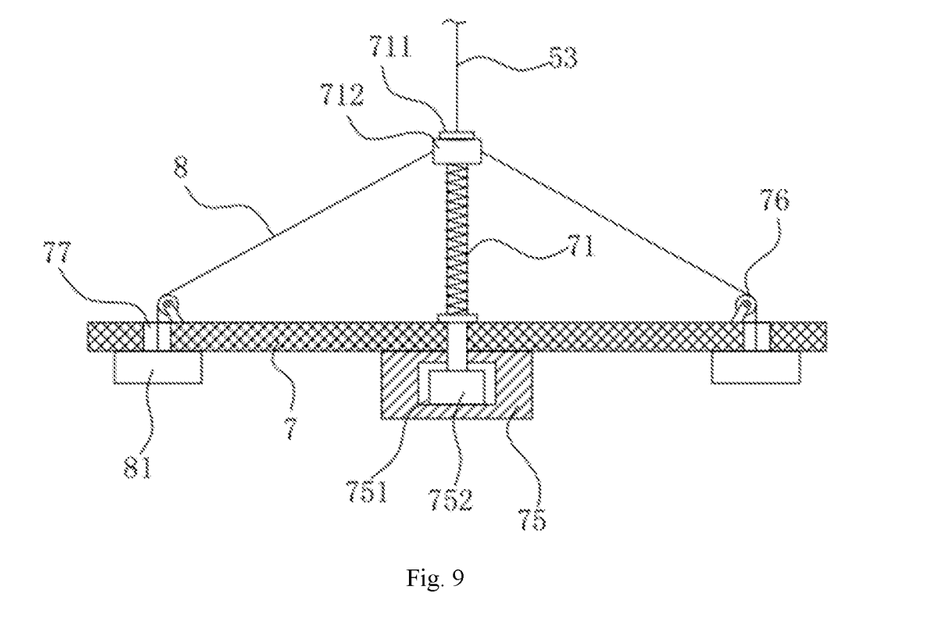
FIG. 9 schematically shows upward movement of a threaded pipe according to an embodiment of the present disclosure.

In this embodiment, the counterweight mechanism includes a screw 71, a threaded pipe 712, a plurality of pull ropes 8 and a lifting structure.

The screw 71 is vertically and rotatably arranged on the balancing disc 7. A top plate 711 is rotatably arranged on an upper end of the screw 71. The free end of the steel tape 53 is fixedly connected to the top plate 711.

The threaded pipe 712 is threadedly connected to the screw.

A side of the balancing disc 7 is circumferentially and evenly provided with a plurality of perforations 77. Preferably, the plurality of perforations 77 are in one-to-one correspondence with the plurality of pull ropes 8. A first end of each of the plurality of pull ropes 8 is fixed on an outer side of the threaded pipe 712, and a second end of each of the plurality of pull ropes 8 passes through a corresponding one of the plurality of perforations 77 to reach a position below the balancing disc 7. The second end of each of the plurality of pull ropes 8 is fixedly connected with a balancing block 81.

The lifting structure is arranged on the balancing disc 7 and includes a counterweight 9 and two limiting assemblies. The counterweight 9 is fixed on a lower side of the balancing disc 7 and is provided with an installation cavity 91 inside. A motor 92 is provided in the installation cavity 91, and is in transmission connection with the screw 71. The two limiting assemblies are symmetrically arranged on the balancing disc 7. Each of the two limiting assemblies includes a slider 73 and a connecting rod 75. The balancing disc 7 is provided with a second cavity 72 in a radial direction, and a second slotted hole 721 is provided on an upper side of the balancing disc 7. The second slotted hole 721 is communicated with the second cavity 72. The slider 73 is slidably arranged on an upper side of the balancing disc 7 in a radial direction of the balancing disc 7, and includes an extension plate 731. The extension plate 731 extends through the second slotted hole 721 to above the balancing disc 7. A first end of the connecting rod 75 is hingedly connected to the outer side of the threaded pipe 712, and a second end of the connecting rod 75 is hingedly connected to the extension plate 731.

When lowering the balancing disc 7, the balancing blocks 81 at the lower ends of the plurality of pull ropes 8 are positioned under the balancing disc 7 to increase a weight around the balancing disc 7. The balancing blocks 81 are circumferentially and evenly arranged to prevent the balancing disc 7 from swinging. When the balancing disc 7 reaches a measuring height, the motor 92 is started to drive the screw 71 to rotate such that the threaded pipe 712 is driven to move upward, and the balancing blocks 81 under the pull ropes 8 are pulled to move upward, thereby finally contacting a lower side of the balancing disc 7. Due to a same length of the pull ropes 8, the balancing disc 7 is in a horizontal state. Meanwhile, the pull ropes 8 are equivalent to several oblique braces for the balancing disc 7, which can prevent the balancing disc 7 from twisting and improve the measurement accuracy of the laser rangefinders 74.

Embodiment 2

As illustrated in FIG. 4, the rotating disc 4 is rotatably arranged on the fixing base 3. An operating rod 42 is vertically arranged on an upper side of the rotating disc 7. A limiting rod 43 is horizontally arranged on the side of the rotating disc 4. Two vertical rods 32 are vertically fixed on the fixing base 3 along a circumferential direction of the fixing base 3. An angle between a connection line between one of the two vertical rods 32 and a center of the rotating disc 7 and a connection line between the other of the two vertical rods 32 and the center of the rotating disc 7 is 90 degrees. Preferably, a length direction of the first limiting rod 43 is consistent with a width direction of the steel tape 53.

A first end of the first rotating shaft 51 extending out of one of the fixing plates 513 is fixedly connected to a second handle 52. An external thread 511 is provided on the second rotating shaft 51 on an outer side of the fixing plate 513, and is threadedly connected to the fixing nut 512. In an initial state, the fixing nut 512 is away from said fixing plate 513. When the steel tape 53 is lowered to a predetermined height, the fixing nut 512 is rotated toward the fixing plate 513, thereby allowing the fixing nut 512 to contact and press the fixing plate 513, so that the first rotating shaft 51 and the steel tape 53 on the reel 5 are fixed at a current position to facilitate measurement.

The rotating disc 4 is driven by the operating rod 42 to rotate. When the first limiting rod 43 contacts one of the first vertical rods 32, the steel tape 53 is lowered to allow the two laser rangefinders 74 to perform measurement to collect multiple sets of data, and multiple total length results are obtained based on the multiple sets of data. A maximum value among the multiple total length results is an inner equatorial diameter A. Then the operating rod 42 is operated to drive the rotating disc 4 to rotate 90 degrees, so that a current connection line between the two laser rangefinders 74 is perpendicular to a previous connection line between the two laser rangefinders 74. Multiple sets of data are collected and multiple total length results are obtained. A maximum value among the multiple total length results is an inner equatorial diameter B. An average value of the inner equatorial diameter A and the inner equatorial diameter B is calculated, so as to obtain an actual inner equatorial diameter C.

Then the steel tape 53 below the reel 5 is kept rotating, and when the balancing disc 7 extends out of an opening at a bottom of the spherical tank 1, an inner vertical diameter D is obtained through a scale difference between the upper opening 11 and a bottom opening of the steel tape 53. Finally, the values of the equatorial inner diameter C and the vertical inner diameter D are used to calculate the volume of the spherical tank in the empty state through a calculation formula as follows:

$$V = \frac{\pi}{6} C^2 \times D \times 10^{-6}.$$

In the formula: V is the volume of the spherical tank, L; C is the inner equatorial diameter, mm; and D is the inner vertical diameter, mm.

What is claimed is:

1. A device for measuring volume of a spherical tank, a top of the spherical tank being provided with an opening, a surrounding plate being provided on an edge of the opening, and the device comprising:
   a base;
   four supporting rods;
   a driving mechanism;
   a rotating disc; and
   a counterweight mechanism;
   wherein the base is fixedly provided with a fixing base with a circular shape; the base is also provided with a first through hole; and the fixing base is provided with a second through hole directly opposite to the first through hole in a vertical direction;
   the four supporting rods are circumferentially arranged on the fixing base; a length direction of each of the four supporting rods is consistent with a radial direction of the fixing base; a lower side of each of the four supporting rods is slidably provided with a sliding rod; and an outer end of the sliding rod is provided with a limiting plate;
   the driving mechanism is arranged on the base, and is configured to drive four sliding rods to simultaneously move along the radial direction of the fixing base;
   the rotating disc is arranged on the fixing base, and is provided with a third through hole located directly above the second through hole; the rotating disc is rotatably provided with a first rotating shaft; the first rotating shaft is coaxially provided with a reel; a steel tape is wound on the reel; a free end of the steel tape is configured to pass through the third through hole, the second through hole and the first through hole in sequence to reach a position below the base, and is provided with a balancing disc; and opposite sides of the balancing disc are each provided with a laser rangefinder; and two laser rangefinders are located on the same straight line; and
   the counterweight mechanism is arranged on the balancing disc, and is configured to keep the balancing disc stable.

2. The device of claim 1, wherein the driving mechanism comprises:
   a rotating ring;
   four transmission structures; and
   a driving structure;
   wherein the rotating ring is coaxially and rotatably provided on the base;
   the four transmission structures are arranged on the base, and are in one-to-one correspondence with the four sliding rods; and each of the four transmission structures is configured to drive a corresponding one of the four sliding rods to slide in the radial direction of the fixing base by using rotation of the rotating ring; and
   the driving structure is arranged on the base, and is configured to drive the rotating ring to rotate.

3. The device of claim 2, wherein each of the four transmission structures comprises:
   a first gear ring;
   a rack; and
   a second rotating shaft;
   wherein the first gear ring is coaxially fixed on an outer side surface of the rotating ring;
   a side of each of the four sliding rods is provided with the rack along a length direction; and
   the second rotating shaft is vertically and rotatably provided on the base; a first gear and a second gear are coaxially provided on the second rotating shaft; the first gear is engaged with the first gear ring; and the second gear is engaged with the rack.

4. The device of claim 3, wherein the driving structure comprises:
   a second gear ring;
   a horizontal shaft;
   a third gear; and
   a handle;
   wherein the second gear ring is coaxially fixed on an upper side of the rotating ring;
   a supporting plate is vertically fixed on the base; the horizontal shaft is rotatably and horizontally arranged on the supporting plate; and a length direction of the horizontal shaft is consistent with a radial direction of the rotating ring;

the third gear is coaxially fixed at an inner end of the horizontal shaft, and is engaged with the second gear ring; and the handle is fixed on an outer end of the horizontal shaft.

5. The device of claim 1, wherein the counterweight mechanism comprises:
- a screw;
- a threaded pipe;
- a plurality of pull ropes; and
- a lifting structure;

wherein the screw is vertically and rotatably arranged on the balancing disc; a top plate is rotatably arranged on an upper end of the screw; and the free end of the steel tape is fixedly connected to the top plate;

the threaded pipe is threadedly connected to the screw;

a side of the balancing disc is circumferentially and evenly provided with a plurality of perforations; the plurality of perforations are in one-to-one correspondence with the plurality of pull ropes; a first end of each of the plurality of pull ropes is fixed on an outer side of the threaded pipe, and a second end of each of the plurality of pull ropes passes through a corresponding one of the plurality of perforations to reach a position below the balancing disc; and the second end of each of the plurality of pull ropes is fixedly connected with a balancing block; and the lifting structure is arranged on the balancing disc, and is configured to drive the threaded pipe to rise and fall along the screw.

6. The device of claim 5, wherein the lifting structure comprises:
- a counterweight; and
- a limiting structure;

wherein the counterweight is fixed on a lower side of the balancing disc, and is provided with an installation cavity inside; a motor is provided in the installation cavity, and is in transmission connection with the screw; and the limiting structure is arranged on the balancing disc, and is configured to limit rotation of the threaded pipe.

7. The device of claim 6, wherein the limiting structure comprises two limiting assemblies symmetrically arranged on the balancing disc; each of the two limiting assemblies comprises a slider and a connecting rod; the slider is slidably arranged on an upper side of the balancing disc in a radial direction of the balancing disc, and comprises an extension plate; and a first end of the connecting rod is hingedly connected to the outer side of the threaded pipe, and a second end of the connecting rod is hingedly connected to the extension plate.

8. The device of claim 1, wherein the rotating disc is rotatably arranged on the fixing base; an operating rod is vertically arranged on an upper side of the rotating disc; a limiting rod is horizontally arranged on the side of the rotating disc; two vertical rods are vertically fixed on the fixing base along a circumferential direction of the fixing base; an angle between a connection line between one of the two vertical rods and a center of the rotating disc and a connection line between the other of the two vertical rods and the center of the rotating disc is 90 degrees; and the limiting rod is configured to rotate between the two vertical rods.

9. The device of claim 1, wherein a lower side of an outer end of each of the four supporting rods is hingedly connected with a suction cup.

10. A method for measuring volume of a spherical tank using the device of claim 4, comprising:

(1) placing the base in the opening of the spherical tank so that the four supporting rods are set up on the surrounding plate; rotating the handle to drive the rotating ring to rotate, so as to simultaneously drive the four first gears to rotate to push the four sliding rods to slide outward;

(2) when the limiting plate is in contact with a side wall of the surrounding plate, and the first through hole, the second through hole, and the third through hole are located directly above the opening of the spherical tank, attaching a suction cup at an outer end of each of the four supporting rods to an outer side wall of the spherical tank;

(3) rotating the reel to lower the steel tape; when a released length of the steel tape is close to a radius of the spherical tank, reducing a lowering speed, starting the two laser rangefinders simultaneously to perform measurement to collect multiple sets of data, and obtaining multiple total length results based on the multiple sets of data, wherein a maximum value among the multiple total length results is an inner equatorial diameter A;

(4) operating the operating rod to drive the rotating disc to rotate 90 degrees, so that a current connection line between the two laser rangefinders on the balancing disc is perpendicular to a previous connection line between the two laser rangefinders, collecting multiple sets of data, calculating multiple total length results, wherein a maximum value among the multiple total length results is an inner equatorial diameter B, and calculating an average value of the inner equatorial diameter A and the inner equatorial diameter B to obtain an actual inner equatorial diameter C;

(5) continuing to rotate the reel to lower the steel tape, and when the balancing disc extends out of an opening at a bottom of the spherical tank, obtaining an inner vertical diameter D through the steel tape; and (6) calculating a volume V of the spherical tank based on the actual inner equatorial diameter C and the inner vertical diameter D.

* * * * *